United States Patent [19]

McIntosh et al.

[11] 3,928,563

[45] Dec. 23, 1975

[54] SELF-SANITIZING FILM FORMER

[75] Inventors: Robert H. McIntosh; Ezekiel H. Hull, both of Greensboro, N.C.

[73] Assignee: Anthony B. Askew, Atlanta, Ga.

[22] Filed: Apr. 22, 1974

[21] Appl. No.: 462,717

Related U.S. Application Data

[60] Continuation-in-part of Ser. No. 292,792, Sept. 27, 1972, abandoned, which is a division of Ser. No. 139,265, April 30, 1971, Pat. No. 3,705,235.

[52] U.S. Cl. .................................................. 424/78
[51] Int. Cl.² ..................... A61K 31/74; A61K 33/24; A61K 31/13
[58] Field of Search ........................................ 424/78

[56] References Cited
UNITED STATES PATENTS

| | | | |
|---|---|---|---|
| 2,097,339 | 10/1937 | Patterson et al. | 424/291 X |
| 2,434,291 | 1/1948 | Smith | 424/291 X |
| 2,525,155 | 10/1950 | Thynne et al. | 424/291 X |
| 2,991,183 | 7/1961 | Lederer et al. | 424/291 X |
| 3,591,679 | 7/1971 | Voss | 424/127 |
| 3,705,235 | 12/1972 | McIntosh et al. | 924/83 |

FOREIGN PATENTS OR APPLICATIONS

| | | |
|---|---|---|
| 1,384,695 | 1/1965 | France |
| 6,401,200 | 8/1964 | Netherlands |

OTHER PUBLICATIONS

Chem. Abst. 67, No. 107597k
Chem. Abst. 67, No. 61717u (1967).
Chem. Abst. 69, No. 67971k (1968).

*Primary Examiner*—Shep K. Rose
*Attorney, Agent, or Firm*—Jones, Thomas & Askew

[57] ABSTRACT

An effective amount of nonionic trialkyl amine and optionally one of a Group II-A or Group II-B metal salt of a monocarboxylic acid having a carbon chain length of 1 to 4, cadmium chloride, or ethylenediaminetetraacetic acid when dispersed in a liquified plastic material may be applied to a surface as a thin film which is fungicidal and bactericidal and effective against both Gram positive and Gram negative organisms including pseudomonas aeruginosa.

7 Claims, No Drawings

SELF-SANITIZING FILM FORMER

CROSS-REFERENCE TO RELATED APPLICATION

This application is a continuation in part of our co-pending application, Ser. No. 292,792 filed Sept. 27, 1972, now abandoned, which in turn was a division of Ser. No. 139,265 filed Apr. 30, 1971, now U.S. Pat. No. 3,705,235 dated Dec. 5, 1972.

This invention relates to a self-sanitizing plastic film and to the sanitizing additive which is incorporated into the plastic film so that the film may be applied to surfaces in liquid or vapor form. More particularly, the present invention concerns a plastic film and an additive for use therein, the combination of which may be applied in liquid or vapor form to surfaces to destroy or significantly reduce over a period of time both Gram negative and Gram positive bacteria including *pseudomonas aeruginosa* which may come in contact with that surface.

Through the present invention there is provided a self-sanitizing plastic film, and a method of preparation thereof, which is effective in killing or significantly inhibiting the growth of disease and infection-producing micro-organisms which come into contact with the surfaces of an article which is coated with the film. The surfaces of many objects found in the home and other such locations as offices and hospitals are susceptible to contamination by bacteria and other harmful organisms. Conventionally, these surfaces may be periodically cleaned with a conventional cleanser to remove accumulated bacteria. Between cleanings, however, it is quite possible that the surfaces may accumulate a sufficient quantity or quality of bacteria to constitute a source of cross-infection or spread of disease.

The self-sanitizing plastic of this invention has the capacity to kill many types of bacteria, streptococci, fungi, and other disease-producing and infection-producing micro-organisms which might come into contact with the surface of an object which is coated with the film. Such microorganisms are those which commonly cause communicable diseases, and in general the self-sanitizing plastic is fatal to organisms which are classified bacteriologically as Gram positive or Gram negative. In addition, the plastic film is specifically deadly to such organisms as *pseudomonas aeruginosa*.

Accordingly, it is an object of the present invention to provide a liquified plastic film which has a self-sanitizing characteristic and may be applied to surfaces of an object by conventional techiques such as painting, spraying, and the like.

Another object of the present invention is the provision of a self-sanitizing plastic film which may be used by human beings with no toxic or irritating effects.

These and other objects, features and advantages of the present invention will become apparent from a review of the following detailed description.

According to the present invention a self-sanitizing plastic material is provided in liquified form so that the material may be applied to a surface by painting the material onto the surface or spraying the material onto the surface. The liquified material contains a solvent which evaporates after application of the material to the surface to leave a hard dry film of self-sanitizing capability.

The liquified plastic material or conventional paint formulation of this invention contains a sanitizing additive which is uniformly dispersed throughout the material. One of the most interesting aspects of the combination of plastic material and additive is the unique ability of the additive to migrate through plastic material and disseminate uniformly over the coated surfaces of articles which have been covered by the plastic film. In addition, the sanitizing additive is constantly replenished by the continued migration and dissemination of additive from within the body of the film.

It has been found that the active sanitizing additive migrates to the surface of the plastic film at a rate sufficient to maintain a level of concentration that will inhibit the growth of a wide spectrum of common bacteria and fungi. Growth of the following organisms, including both Gram-negative and Gram positve bacteria, has been found to be inhibited by the present self-sanitizing plastic film: *sarcina lutea, staphylococcus aureus, staphylococcus albus, pseudomonas aeruginosa, escherichia coli, klebsiella, candida albicans, salmonella chloreasius, enterobacter aerogenes, escherichia communior, streptococcus pyogenes.*

The sanitizing additive of the present invention is a nonionic trialkyl amine and optionally one of a Group II-A or Group II-B (from the Periodic Table) metal salt of a monocarboxylic acid having a carbon chain length of 1 to 4, cadmium chloride, or ethylenediaminetetraacetic acid. Suitably, the trialkyl amine includes two alkyl groups which have a carbon chain length of 1 to 4 atoms and one alkyl group which has a carbon chain length of 8 to 18 atoms. Preferably, the trialkyl amine is a dimethylalkyl amine wherein the alkyl group has from 10 to 14 carbon atoms.

Suitably, the Group II-A or Group II-B metal salt of a monocarboxylic acid includes the barium, cadmium and strontium salts of acetic acid, propionic acid and butyric acid. The most preferred of these salts is barium acetate.

The most preferred sanitizing additive is a mixture of dimethyllaurylamine and barium acetate in a part-by-weight ratio range of 3:1 to 1:3 for amine to acetate. A preferred part-by-weight ratio range for amine to acetate is 70 to 50 parts by weight to 30 to 50 parts by weight. A most preferred part-by-weight ratio is 60 parts amine to 40 parts acetate.

When blending the additive into a liquified film forming plastic material, a suitable concentration is 0.10% to 20% of additive in film former by weight. The preferred and particularly preferred concentration for additive in liquified plastic depends upon the composition of the liquified plastic.

In preparing the amine-acetate sanitizing additive for incorporation into a liquified plastic material, a mixture of dimethyllaurylamine and barium acetate is most preferred. Granular barium acetate of a particle size of approximately minus 4 mesh (U.S. Standard Screen Size) is added to an oily liquid dimethyllaurylamine in a part-by-weight ratio as previously discussed in a ball mill. The ball mill mixes and grinds the mixture to a point where the particle sizes of the granular barium acetate are reduced sufficiently for the barium acetate to remain in suspension in the amine. Preferably, the acetate is reduced from minus 4 mesh to minus 325 mesh in the ball milling operation over a period of 72 hours.

An appropriate amount of the amine-acetate suspension is then added to a mixing machine containing a sufficient weight of a liquified plastic material to produce a homogeneous dispersion. As a result, the amine-acetate suspension remains dispersed in the liquified plastic material over an extended period of time.

The liquified plastic material consists of a plastic material which is dissolved or dispersed in a solvent or dispersant which can be vaporized under conventional atmospheric conditions to leave a solid dry film of plastic material. A preferred solvent system comprises polystyrene dissolved in perchloroethylene and a preferred dispersant system comprises poly-vinyl acetate emulsified in water. When using a solvent system it is preferred that from 0.5% to 20% by weight of polystyrene be dissolved in perchloroethylene. A particularly preferred concentration is 1% to 15% by weight of polystyrene dissolved in perchloroethylene. When using a dispersant system it is preferred that from 0.5% to 50% by weight of polyvinyl acetate by emulsified in water. A particularly preferred concentration is 10% to 40% by weight of polyvinyl acetate emulsified in water.

When employing a perchloroethylene-polystyrene film forming system, it is preferred that from 0.1% to 10% (based on the total weight of the perchloroethylene-polystyrene material) by weight of the sanitizing additive be dissolved in the film forming liquified plastic material. When employing polyvinyl acetate emulsion in water as the film former, it is preferred that from 1% to 15% (based on the total weight of the polyvinyl acetate emulsion) by weight of sanitizing additive be dissolved in the polyvinyl acetate emulsion in water liquified plastic material. Particularly preferred concentrations of additive in film-forming plastic material are as follows:

1. 0.25% to 5% by weight of sanitizing additive in the polystyrene-perchloroethylene film forming material.
2. 2% to 10% by weight of sanitizing additive in the polyvinyl acetate emulsion in water film-forming material.

The liquified plastic material containing sanitizing additive may now be applied to the surfaces of objects and articles to impart its bactericidal and fungicidal properties thereto. The material may be painted onto the surfaces or may be sprayed into the surfaces as by pump-sprayer or aerosol sprayer. In either case, a thin adherent film of plastic material is obtained covering the surfaces of the object or article.

EXAMPLE I

To 90 parts by weight of perchloroethylene is added 7 parts by weight of polystyrene to obtain a solution. Three parts of a sanitizing additive comprising equal amounts of dimethyllaurylamine and barium acetate are then added to the solution. The mixture is then sprayed on the surfaces of plastic discs and dried at room temperature for twenty minutes. The perchloroethylene evaporates leaving a hard dry film on the plastic discs. The discs are then placed within appropriately impregnated petri dishes containing a nutrient agar. It is found upon incubation of the dishes that the discs inhibit the growth of bacteria and fungi around the discs and create a zone of inhibition. The results for the listed organisms are as follows:

TABLE A

| ORGANISM | ZONE OF INHIBITION IN MILLIMETERS* |
| --- | --- |
| Sarcina Lutea | Complete inhibition throughout petri dish |
| Staph. Aureus | 11 |
| Pseudomonas Aeruginosa | 5 |
| E. Coli | 5 |
| Klebsiella | 18 |
| Candida Albicans | 8 |
| Salmonella Choleraesius | 35 |

*radius of concentric band around disc

EXAMPLE II

The procedure of Example I is repeated except that equal parts of ethylenediaminetetraacetic acid and dimethyllaurylamine are used as the sanitizing additive. The results obtained are as follows:

TABLE B

| ORGANISM | ZONE FOR INHIBITION IN MILLIMETERS |
| --- | --- |
| Sarcina Lutea | 9 |
| Staph. Aureua | 7 |
| Pseudomonas Aeruginosa | 5 |
| E. Coli | 5 |
| Klebsiella | 9 |
| Candida Albicans | 7 |
| Salmonella Choleraesius | 10 |

EXAMPLE III

The procedure of Example I is repeated except that equal parts of cadmium chloride and dimethyllauryl amine are used as the sanitizing additive. The results obtained are as follows:

TABLE C

| ORGANISM | ZONE FOR INHIBITION IN MILLIMETERS |
| --- | --- |
| Sarcina Lutea | 10 |
| Staph. Aureus | 10 |
| Pseudomonas Aeruginosa | 10 |
| E. Coli | 10 |
| Klebsiella | 15 |
| Candida Albicans | 23 |
| Salmonella Choleraesius | 45 |

EXAMPLE IV

An emulsion containing thirty parts by weight of polyvinyl acetate and seventy parts by weight of water is prepared. Three parts of a sanitizing additive comprising equal amounts of dimethyllaurylamine and barium acetate are then added to the emulsion. The mixture is then painted onto the surfaces of plastic discs and dried at room temperature for forty-five minutes. The water evaporates leaving a hard dry film on the plastic discs. The discs are then placed within appropriately impregnated petri dishes containing a nutrient agar. It is found upon incubation of the dishes that the discs inhibit the growth of bacteria and fungi around the discs and create a zone of inhibition. The results for the listed organisms are as follows:

TABLE D

| ORGANISM | ZONE OF INHIBITION IN MILLIMETERS |
| --- | --- |
| Sarcina Lutea | Complete inhibition throughout petri dish |
| Staph. Aureus | 10 |

TABLE D-continued

| ORGANISM | ZONE OF INHIBITION IN MILLIMETERS |
|---|---|
| Pseudomonas Aeruginosa | 6 |
| E. Coli | 4 |
| Klebsiella | 17 |
| Candida Albicans | 7 |
| Salmonella Choleraesius | 32 |

The combination of the present additive in polyvinyl acetate emulsion may be added to polyvinyl acetate base paints in place of mercury and mercury compounds to reduce the formation of mold and other such organisms on painted surfaces. It is suitable to employ from about 1% to about 15% by weight of the sanitizer in the paint formulation and a preferable concentration is 5% to 10% by weight.

The sanitizer alone may also be incorporated into conventional paint formulations to impart its sanitizing capability to the paint formulation. Preferable concentrations for sanitizer in paint formulation is 0.1% to 5% by weight based on the weight of the paint formulation.

While this invention has been described in detail with particular reference to preferred embodiments thereof, it will be understood that variations and modifications can be effected within the spirit and scope of the invention as described hereinbefore and as defined in the appended claims.

We claim:

1. A self-sanitizing film former comprising a mixture of a polyvinylacetate film forming plastic material, emulsified in water, and an effective amount of a sanitizing agent consisting essentially of a nonionic trialkyl amine and a Group II-A or Group II-B metal salt of a monocarboxylic acid having a carbon chain length of 1 to 4.

2. A paint formulation containing an effective amount of a sanitizing additive consisting essentially of a nonionic trialkyl amine and a Group II-A or Group II-B metal salt of a monocarboxylic acid having a carbon chain length of 1 to 4.

3. Self-sanitizing film former as described in claim 1 wherein the sanitizing agent consists essentially of a mixture of dimethyllaurylamine and barium acetate.

4. Paint formulation as described in claim 2 wherein the sanitizing agent consists essentially of a mixture of dimethyllaurylamine and barium acetate.

5. Self-sanitizing film former as described in claim 3 wherein the film former contains from 0.10% to 20% by weight of a mixture of dimethyllaurylamine and barium acetate in a part-by-weight ratio for amine to acetate of 3:1 to 1:3.

6. Paint formulation as described in claim 4 wherein the formulation contains from 1% to 15% by weight of a mixture of dimethyllaurylamine and barium acetate in a part-by-weight ratio for amine to acetate of 3:1 to 1:3.

7. Self-sanitizing film former as described in claim 1 wherein from 0.5% to 50% by weight of polyvinylacetate is emulsified in water as the film forming plastic material.

* * * * *